UNITED STATES PATENT OFFICE.

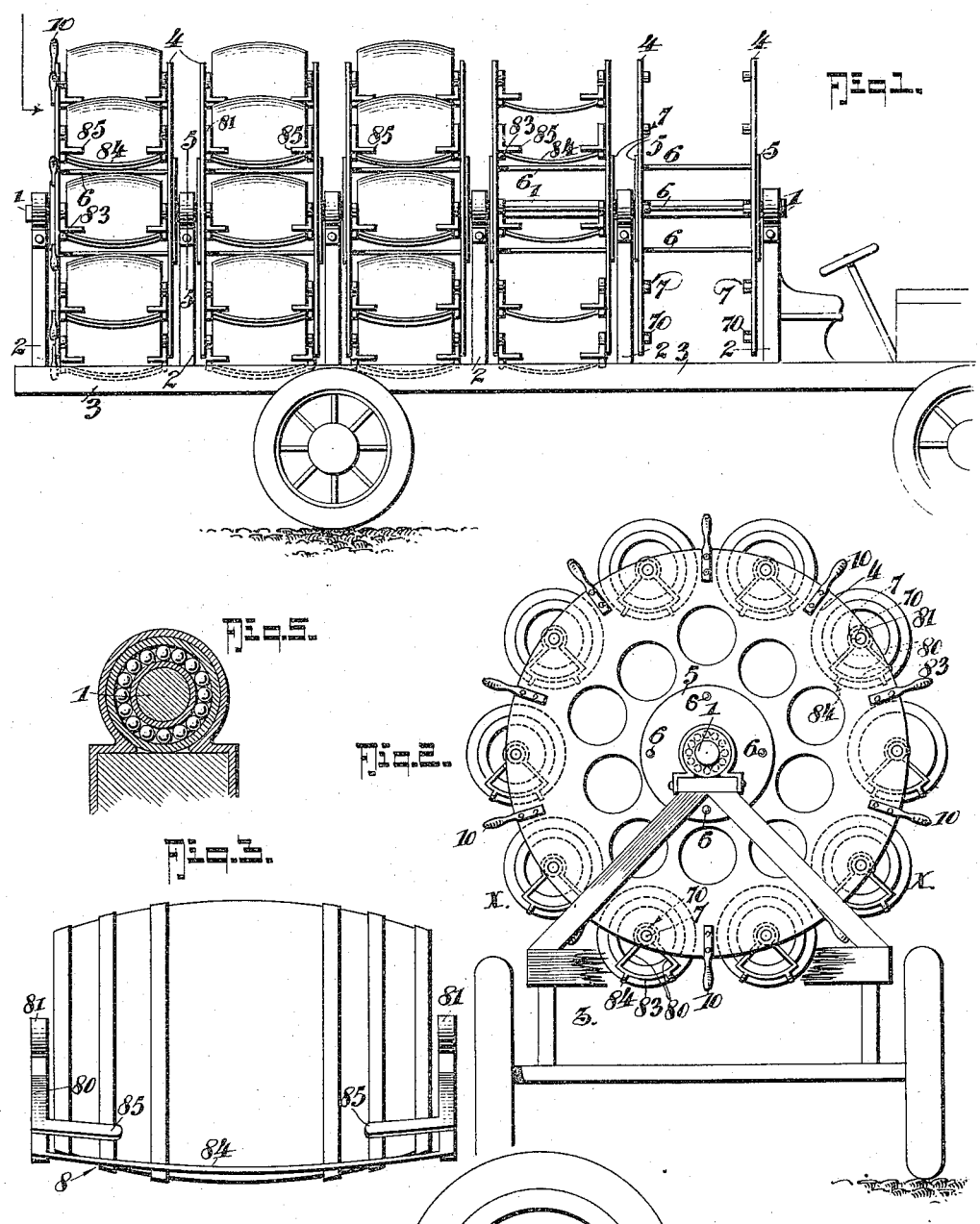

WILLIAM H. MARTIN, OF YOUNTVILLE, CALIFORNIA, ASSIGNOR OF ONE-HALF TO HIRAM WILSON, OF YOUNTVILLE, CALIFORNIA.

REVOLVING SUSPENSION-RACK.

1,151,210.   Specification of Letters Patent.   Patented Aug. 24, 1915.

Application filed July 8, 1914. Serial No. 849,694.

*To all whom it may concern:*

Be it known that I, WILLIAM H. MARTIN, residing at Yountville, in the county of Napa and State of California, have invented new and Improved Revolving Suspension-Racks, of which the following is a specification.

My present invention relates to improvements in that class of racks or supporting means more especially designed for being mounted upon motor trucks and adapted for transporting heavy kegs, casks and the like, and for holding them in suspension during transportation or carting, in such a manner that they are free of danger of rolling off the truck.

Among other objects my present invention has for its object to provide an improved revolving suspension rack of the character stated in which a plurality of series of racks may be readily mounted upon a truck so that the barrels, etc., can be easily handled in the act of placing them (from either side of the truck) upon, or removing them from the racks, and the several or series of racks revolved together as a single revolving rack.

With other objects in view that will be hereinafter explained, my present invention consists in the novel arrangement and the peculiar combination of the parts hereinafter described and claimed, and illustrated in the accompanying drawings, in which:

Figure 1 is a side elevation of a motor truck equipped with a series of my improved revolving rack mechanisms. Fig. 2 is an end elevation thereof looking in the direction of the arrow on Fig. 1. Fig. 3 is a side view of the barrel holding cradle or slings. Fig. 4 is an end view thereof. Fig. 5 is a detail cross section on the line 5—5 on Fig. 1.

In carrying out my present invention, and when arranged for carrying a large load or number of the heavy casks or kegs, I employ a number of the racks, (five of such racks being shown in Fig. 1) three of which are shown as fully loaded with beer barrels, and some of the others being shown with some of the cradle members omitted to the more clearly illustrate the detailed construction of the cradles and their sustaining means.

In the construction shown in Fig. 1, all of the separate revolving racks are fixedly held on a single shaft or reach member 1, horizontally mounted on the standards 2 fixedly supported upon and that extend vertically from the truck frame 3, the said shaft being so positioned, relatively to the said frame 3, that the cradles or barrel supporting members, when brought down into position for loading or unloading the barrels are as low as the said frame 3, as is clearly shown in Fig. 2 of the drawing. Each revolving rack is in the nature of a wheel composed of two disks 4—4 of a large diameter, preferably six feet, when used for transporting heavy beer kegs and the like, and the said disks are of sheet steel and suitably perforated to reduce their weight. Each disk, at the central or axial portion is reinforced by another disk 5 of much smaller diameter than the larger disk.

6 designate rods that extend transversely and join with the opposite end disks and serve as braces for the wheel.

Each disk 4 has a series of inwardly projected studs 7 provided with brass bushings or sleeves 70, and as is best shown in Fig. 2, ten of such studs 7, are projected from each disk, the studs on one disk alining those of the opposing disk, whereby to provide ten pairs or sets of such studs.

By referring to Fig. 2, it will be noticed the studs are located near the peripheral edge of their respective disks, they being so located to permit the cradles or slings which hang pendent from the studs to extend beyond the opposite side edges of the said disks as they come to the barrel loading or unloading position.

The cradles or slings 8, one of which is hung from each set of opposing studs 7 are constructed in the manner best shown in Fig. 3, from which it will be seen the same consist of two end members 80 of triangular shape, the apex end of each of which terminates in a hanger loop 81 adapted for swingably engaging the stud bushings 70.

The base portions 83 of the members 80 are curved on an arc concentric with the studs on which the cradles hang and the said portions 83 are joined by the distance or cross pieces 84, which are sufficiently separated to provide for seating the barrels or casks thereon.

To positively hold the barrel on its seat and avoid danger of its rolling off during carting, each cradle includes projecting fingers 85 integral with the ends, that extend inwardly to embrace the ends of the barrel at points sufficiently above the distance members to keep the barrel from rolling off the said members during transportation and to form end supports for steadying the barrel ends when the cradles reach the low or unloading point.

To facilitate an easy turning of all the revolving racks, the main shaft upon which all of the said racks are supported, is mounted on ball bearings and to provide for turning all of the sections that constitute the entire rack, the outermost disk of the outer or rear rack has handles 10 that project radially from the said disk, as shown.

By reason of the peculiar construction and arrangement of the parts so far shown and described, anyone of the barrels can be removed from either side of the machine in a quick and convenient manner without interfering with any of the other barrels, since to unload it is only necessary to grasp one of the handles on the outer rack and turn the entire revolving structure to the side from which it is desired to unload, it being also understood from Fig. 2, that when the barrel reaches the points designated X—X, on the said Fig. 2, but a slight effort is necessary to drop or roll the barrel onto a skid to discharge it to one side of the truck, since by pressing the cradle to swing inwardly, the barrel will be caused to readily roll out of its cradle seat.

What I claim is:

In a wagon rack for carting beer and other heavy kegs, barrels and the like, the combination with a truck frame and standards thereon; of a shaft horizontally journaled in the upper ends of the standards, a rack fixedly held on the shaft and comprising opposite end disks, each having opposing sets of studs near their peripheral edges, a cradle mounted on each opposing set of the said studs, said cradles including triangular shaped ends, the apices of which terminate in loops for hanging on the said opposing sets of studs, the base portion of the said cradles including integral distance members longitudinally curved to form seats for receiving the kegs or barrels, the said base portions also including fingers located above and that project in parallelism with the distance members for lapping over the end of the barrels or kegs.

W. H. MARTIN.

Witnesses:
H. N. BRYANT,
JOHN WILSON.

Copies of this patent may be obtained for five cents each, by addressing the "Commissioner of Patents Washington, D. C."